United States Patent
Shinoda et al.

(10) Patent No.: US 9,739,684 B2
(45) Date of Patent: Aug. 22, 2017

(54) LEAK-DETECTION DEVICE, PROGRAM, AND CONTROL METHOD

(71) Applicant: NEC Corporation, Minato-ku, Tokyo (JP)

(72) Inventors: Shigeki Shinoda, Tokyo (JP); Tetsuya Yoshinari, Tokyo (JP); Shohei Kinoshita, Tokyo (JP); Hiromi Yamamoto, Tokyo (JP); Masatake Takahashi, Tokyo (JP); Yasuhiro Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 148 days.

(21) Appl. No.: 14/430,390

(22) PCT Filed: Sep. 6, 2013

(86) PCT No.: PCT/JP2013/074123
§ 371 (c)(1),
(2) Date: Mar. 23, 2015

(87) PCT Pub. No.: WO2014/050511
PCT Pub. Date: Apr. 3, 2014

(65) Prior Publication Data
US 2015/0211953 A1    Jul. 30, 2015

(30) Foreign Application Priority Data

Sep. 28, 2012  (JP) .................. 2012-215672

(51) Int. Cl.
*G01M 3/16* (2006.01)
*G01M 3/24* (2006.01)

(52) U.S. Cl.
CPC .............. *G01M 3/16* (2013.01); *G01M 3/243* (2013.01)

(58) Field of Classification Search
CPC ...... G01M 3/243; G01M 3/2807; G01M 3/16; G01M 3/18; G01M 3/165; G01M 3/246;
(Continued)

(56) References Cited

U.S. PATENT DOCUMENTS

| 6,404,343 B1 | 6/2002 | Andou et al. |
| 2005/0275528 A1* | 12/2005 | Kates ................. G08B 1/08 340/539.22 |
| 2011/0301882 A1 | 12/2011 | Andersen |

FOREIGN PATENT DOCUMENTS

| JP | S62055540 A | 3/1987 |
| JP | H11271168 A | 10/1999 |

(Continued)

OTHER PUBLICATIONS

Extended European Search Report for EP Application No. EP13842987.3 dated May 4, 2016.
(Continued)

*Primary Examiner* — An T Nguyen

(57) ABSTRACT

A signal acquisition unit (2020) acquires a signal. From the signal acquired by the signal acquisition unit (2020), a detection signal extraction unit (2060) extracts, as a detection signal, a signal of any frequency band among a plurality of partial detection frequency bands into which the frequency band that is the subject of detection has been divided. A determination unit (2070) determines, in order, for each detection signal corresponding to each of the different partial detection frequency bands, whether the detection signal shows any leakage, and if at least a prescribed number of the detection signals are not showing any leakage, determines that leakage is not taking place.

12 Claims, 10 Drawing Sheets

(58) Field of Classification Search
CPC .. G01H 3/08; G01F 1/666; G01F 1/74; G01N 2291/02416; G01N 29/14; G01N 29/4454; G01N 29/222; E21B 47/101
See application file for complete search history.

(56) References Cited

FOREIGN PATENT DOCUMENTS

| | | | |
|---|---|---|---|
| JP | 2002122502 | A | 4/2002 |
| JP | 2004245618 | A | 9/2004 |
| JP | 3156865 | U | 12/2009 |

OTHER PUBLICATIONS

International Search Report for PCT Application No. PCT/JP2013/074123, mailed on Nov. 26, 2013.
English Translation of write opinion for PCT Application No. PCT/JP2013/074123.

* cited by examiner

LEAK-DETECTION DEVICE, PROGRAM, AND CONTROL METHOD

This application is a National Stage Entry of PCT/JP2013/074123 filed on Sep. 6, 2013, which claims priority from Japanese Patent Application 2012-215672 filed on Sep. 28, 2012, the contents of all of which are incorporated herein by reference, in their entirety.

TECHNICAL FIELD

The present invention relates to a leak inspection device, program, and control method.

BACKGROUND ART

As social infrastructure, equipment such as water and wastewater systems, high-pressure chemistry pipelines for gas, petroleum, and the like, high-speed railways, long big bridges, superhigh-rise buildings, large passenger aircrafts, and vehicles is built. One of the important members of the equipment is pipes for passing fluid such as gas or water. In some cases, pipes may break due to deterioration or a natural disaster. When pipes break and the fluid leaks out, the broken part has to be repaired. For this purpose, there is a need to detect a leak of the fluid in the pipes. Hereinbelow, an inspection of the presence/absence of a leak of a fluid in pipes will be referred to as a leak inspection.

A general leak inspection is an auditory sensory inspection of listening for a leak sound by a person. In many cases, however, pipes are arranged under the ground or at a high place, and an inspection by manpower involves danger and great effort. To address the problem, devices performing a leak inspection have been proposed.

PTL1 discloses a method of detecting a pipe passing sound via microphones at both ends of an inspection interval, making detection signals taken by the microphones to be divided into a plurality of frequency bands by passing through a band-pass filter, obtaining a cross-correlation coefficient average of the frequency bands, and specifying a pipe leak point.

PTL2 discloses a method of disassembling a vibration signal caused by a water leak of a water pipe into a plurality of frequency components, evaluating a fluctuation amount with time of each of frequency components, and detecting the water leak of the water pipe.

CITATION LIST

Patent Literature

PTL1: Japanese Laid-open Patent Publication No. 11-271168A
PTL2: Japanese Laid-open Patent Publication No. 2004-245618A

SUMMARY OF INVENTION

Technical Problem

Much effort is required to maintain a leak inspection device. One of the reasons is that since pipes are often arranged under the ground or at a high place, the leak inspection device is also often arranged under the ground or at a high place. Another reason is that a number of leak inspection devices are installed for a pipe. Consequently, to lower the frequency of maintenance of a leak inspection device, the inventors of the present invention have examined to reduce energy consumption of the leak inspection device and increase the operation life of the leak inspection device.

An object of the present invention is to provide a leak inspection device with small energy consumption, and a program and a control method for controlling the leak inspection device.

Solution to Problem

A leak inspection device provided by the present invention includes: signal acquisition means for acquiring a signal; inspection signal extraction means for extracting, as an inspection signal, a signal of partial inspection frequency band in any of a plurality of partial inspection frequency bands obtained by dividing a frequency band as an inspection target, from the signal acquired by the signal acquisition means; and determination means for sequentially determining whether the inspection signals corresponding to the partial inspection frequency bands which are different from one another indicate a leak or not and, when predetermined number or more of the inspection signals do not indicate a leak, determining that there is no leak.

A program provided by the present invention is a program which makes a computer to have functions of functional components of the above-described leak inspection device provided by the present invention.

A control method provided by the present invention is executed by a computer operating as a leak inspection device. The control method has: a signal acquisition step of acquiring a signal; an inspection signal extraction step of extracting, as an inspection signal, a signal of partial inspection frequency band in any of a plurality of partial inspection frequency bands obtained by dividing a frequency band as an inspection target, from the signal acquired in the signal acquisition step; and a determination step of sequentially determining whether the inspection signals corresponding to the partial inspection frequency bands which are different from one another indicate a leak or not and, when predetermined number or more of the inspection signals do not indicate a leak, determining that there is no leak.

Advantageous Effects of Invention

The present invention can provide a leak inspection device, and a program and a control method of controlling the leak inspection device with small energy consumption.

BRIEF DESCRIPTION OF DRAWINGS

The above-described object, other objects, features, and advantages will become more apparent by the following preferred exemplary embodiments and the following drawings accompanying the exemplary embodiments.

DESCRIPTION OF EMBODIMENTS

Hereinafter, exemplary embodiments of the present invention will be described with reference to the drawings. In all of the drawings, the same or corresponding numerals are designated to the same or corresponding components, and the description will be properly omitted.

In the following description, each component of each device is not a configuration of a hardware unit but expresses a block of a function unit. Each component of each device is realized by an arbitrary combination of hardware and software such as a CPU of an arbitrary computer, a memory, a program realizing a component of the drawings loaded to the memory, storage media such as a hard disk storing the program, and an interface for network connection. There are various modifications to the methods and devices that realize the components.

First Exemplary Embodiment

<Outline>

Figure 1:
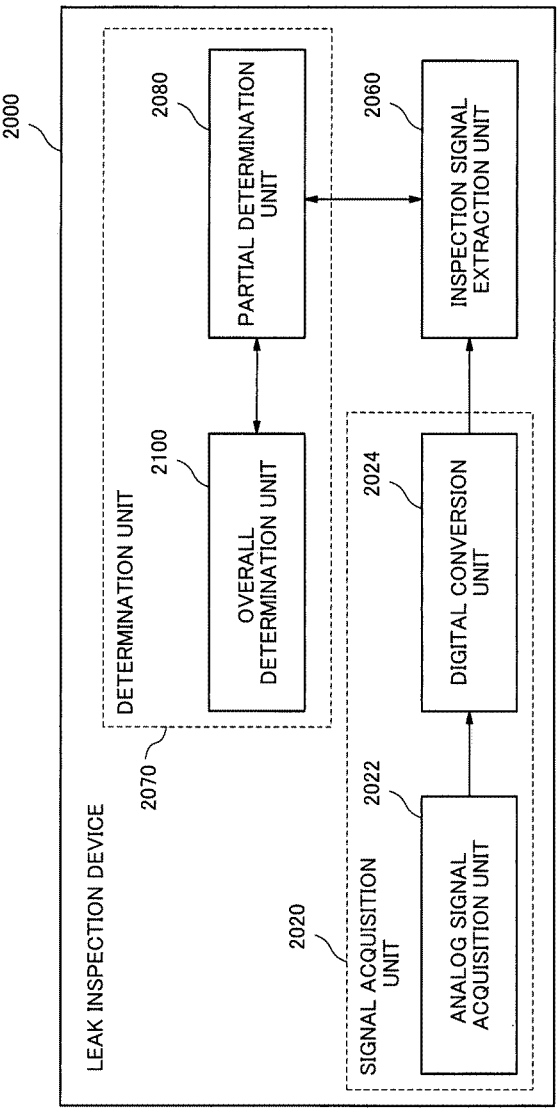
FIG. 1 is a block diagram illustrating a leak inspection device according to a first exemplary embodiment.

FIG. 1 is a block diagram illustrating a leak inspection device 2000 according to a first exemplary embodiment. In FIG. 1, arrows express the flow of information.

The leak inspection device 2000 has a signal acquisition unit 2020, an inspection signal extraction unit 2060, and a determination unit 2070. The signal acquisition unit 2020 acquires a signal. For example, the signal is a signal indicating a vibration of a pipe or a vibration propagating from a pipe.

The inspection signal extraction unit 2060 receives a signal from the signal acquisition unit 2020 and extracts a signal in a predetermined frequency band from the acquired signal. The inspection signal extraction unit 2060 acquires the predetermined frequency band from the determination unit 2070. The predetermined frequency band is one of a plurality of frequency bands obtained by dividing a frequency band as an inspection target. The frequency band as an inspection target is a frequency band which, when a leak occurs in a pipe for example, the magnitude of the vibration becomes large as a result of the leak. Hereinbelow, each of the plurality of frequency bands obtained by dividing the frequency band as an inspection target will be described as a partial inspection frequency band. A signal in a predetermined frequency band extracted by the inspection signal extraction unit 2060 will be described as an inspection signal.

The determination unit 2070 sequentially determines whether inspection signals corresponding to different partial inspection frequency bands indicate a leak or not. When predetermined number or more of inspection signals do not indicate a leak, the determination unit 2070 determines that there is no leak. Hereinbelow, the predetermined number will be described as required determination number. The required determination number may be one or two or more.

As described above, the leak inspection device 2000 sequentially determines whether each inspection signal corresponding to a plurality of partial inspection frequency bands obtained by dividing a frequency band as an inspection target indicates a leak or not. When the required determination number or more of inspection signals do not indicate a leak, no leak is determined as an inspection result. When it is determined that each inspection signal corresponding to the required number or more of the partial inspection frequency bands does not indicate a leak, the leak inspection device 2000 does not have to perform a process on a partial inspection frequency at which the inspection is not performed yet at this time point. Consequently, according to the leak inspection device 2000 of the exemplary embodiment, since the process amount required for the leak inspection becomes smaller, the energy consumption of the leak inspection device 2000 is reduced.

Hereinbelow, the details of the exemplary embodiment will be described.

<Details of Determination Unit 2070>

For example, the determination unit 2070 has a partial determination unit 2080 and an overall determination unit 2100. The partial determination unit 2080 determines whether an inspection signal corresponding to one partial inspection frequency band indicates a leak or not. The partial determination unit 2080 obtains any one of a plurality of partial inspection frequency bands from the overall determination unit 2100. The partial determination unit 2080 inputs the obtained partial inspection frequency band to the inspection signal extraction unit 2060. The partial determination unit 2080 acquires an inspection signal corresponding to the input partial inspection frequency band from the inspection signal extraction unit 2060. The partial determination unit 2080 determines whether the acquired inspection signal indicates a leak of a pipe or not.

For example, when a value obtained by performing a statistical process on the absolute value of the amplitude of an inspection signal is smaller than a predetermined threshold, the partial determination unit 2080 determines that the inspection signal does not indicate a leak. The statistical process is, for example, a process of obtaining a maximum value or a process of obtaining an average value.

The overall determination unit 2100 determines the presence/absence of a leak as an inspection result on the basis of determination made by the partial determination unit 2080. Concretely, the overall determination unit 2100 sequentially selects one partial inspection frequency band from a plurality of partial inspection frequency bands and inputs it to the partial determination unit 2080 to make the partial determination unit 2080 operate in order. The overall determination unit 2100 obtains a result of determination made by the partial determination unit 2080 on the input partial inspection frequency band. When the partial determination unit 2080 determines that an inspection signal corresponding to each of required determination number or more of the partial inspection frequency bands does not indicate a leak, the overall determination unit 2100 determines no leak as an inspection result. Hereinbelow, a series of processes performed by the overall determination unit 2100 of the exemplary embodiment will be described as an overall determination process.

There are various methods in determining a frequency band as an inspection target and a plurality of partial inspection frequency bands by the overall determination unit 2100. For example, the overall determination unit 2100 acquires inspection frequency band information indicating a plurality of partial inspection frequency bands. For example, the inspection frequency band information is information indicating an upper-limit frequency and a lower-limit frequency of each of the partial inspection frequency bands.

Alternatively, for example, the overall determination unit 2100 acquires information indicating a frequency band as an inspection target and information indicating the division number of the frequency band as an inspection target. The acquired division number is set as N. The overall determination unit 2100 sets, as a partial inspection frequency band, each of frequency bands obtained by dividing the acquired frequency band as an inspection target into N pieces.

Alternatively, for example, the overall determination unit 2100 may fixedly set a plurality of partial inspection frequency bands.

The overall determination unit 2100 of the exemplary embodiment supplies a plurality of partial inspection frequency bands in order, for example, from the partial inspection frequency band in which the frequency is lowest to the partial determination unit 2080 and sequentially acquires results of determinations made by the partial determination unit 2080. Generally, the frequency of a vibration indicating a leak is low. Consequently, to perform the determination by the partial determination unit 2080 in order from a partial inspection frequency band having high probability that a signal indicating a leak is included, the determination by the partial determination unit 2080 is performed in order from the partial inspection frequency band in which the frequency is lowest.

<Details of Signal Acquisition Unit 2020>

The signal acquisition unit 2020 acquires a signal indicating a vibration of a pipe or a vibration propagating from a pipe. The signal indicates, for example, the magnitude of a vibration of a pipe or the magnitude of a vibration propagating from a pipe. The signal may be an analog signal or a digital signal. The signal acquisition unit 2020 is realized by, for example, a device measuring a vibration of a pipe or a vibration propagating from a pipe. A device measuring a vibration of a pipe or a vibration propagating from a pipe is, for example, a vibration sensor. For example, a vibration sensor has a piezoelectric element which converts a vibration to an electric signal. Hereinbelow, a device measuring a vibration of a pipe or a vibration propagating from a pipe will be described as a vibration measuring device.

When the signal acquisition unit 2020 acquires an analog signal, the vibration digital signal acquisition unit 2020 acquires, as a signal to be acquired, an analog signal as a result of measurement of a vibration of a pipe or a vibration propagating from a pipe by a vibration measuring device.

When the signal acquisition unit 2020 acquires a digital signal, the signal acquisition unit 2020 acquires, as a signal to be acquired, a digital signal converted from an analog signal acquired by a vibration measuring device. In this case, the signal acquisition unit 2020 has, as illustrated in FIG. 1, an analog signal acquisition unit 2022 acquiring an analog signal and a digital conversion unit 2024 converting an analog signal acquired from the analog signal acquisition unit 2022 to a digital signal. The digital conversion unit 2024 is realized by, for example, an AD converter.

The digital conversion unit 2024 converts an analog signal acquired from the analog signal acquisition unit 2022 to a digital signal at a predetermined sampling frequency. There are a variety of predetermined sampling frequencies. For example, from the inspection signal extraction unit 2060, the digital conversion unit 2024 acquires a partial inspection frequency band which is input to the inspection signal extraction unit 2060. On the basis of the acquired partial inspection frequency band, the digital conversion unit 2024 determines a predetermined sampling frequency. For example, the higher the frequency included in the acquired partial inspection frequency band is, the digital conversion unit 2024 makes the predetermined sampling frequency higher. In this case, the predetermined sampling frequency is calculated, for example, so as to satisfy the condition of the following equation 1. Parameter $f_s$ denotes a predetermined sampling frequency, and $f_m$ denotes an upper-limit frequency of a partial inspection frequency band acquired from the inspection signal extraction unit 2060.

$$fs \geq fm \times 2 \qquad \text{Equation 1}$$

Alternatively, for example, the digital conversion unit 2024 may use a value manually input to the leak inspection device 2000 as a predetermined sampling frequency. The predetermined sampling frequency may be set fixedly in the digital conversion unit 2024.

<Details of Inspection Signal Extraction Unit 2060>

The inspection signal extraction unit 2060 has, for example, a filtering unit constructed by a high-pass filter, a low-pass filter, a band-pass filter, or a combination of those filters. The inspection signal extraction unit 2060 extracts a signal in a predetermined frequency band from a signal acquired from the signal acquisition unit 2020 by using the filtering unit. The predetermined frequency band is a partial inspection frequency band acquired from the determination unit 2070. For example, when the determination unit 2070 has the partial determination unit 2080, the predetermined frequency band is a partial inspection frequency band acquired from the partial determination unit 2080.

When a signal acquired from the signal acquisition unit 2020 is an analog signal, the inspection signal extraction unit 2060 extracts an analog signal in a predetermined frequency band from the analog signal acquired from the signal acquisition unit 2020. In this case, the inspection signal extraction unit 2060 has, for example, analog filters corresponding to partial inspection frequency bands. The inspection signal extraction unit 2060 selects an analog filter corresponding to the partial inspection frequency band acquired from the partial determination unit 2080 and extracts an inspection signal by using the selected analog filter.

When a signal acquired from the signal acquisition unit 2020 is a digital signal, the inspection signal extraction unit 2060 extracts a digital signal in a predetermined frequency band from the digital signal acquired from the signal acquisition unit 2020. In this case, the inspection signal extraction unit 2060 has, for example, a digital filter capable of setting a frequency band to be extracted. The inspection signal extraction unit 2060 sets, as a frequency band extracted by the digital filter, a partial inspection frequency band acquired from the partial determination unit 2080 and, after that, extracts an inspection signal by using the digital filter.

The inspection signal extraction unit 2060 acquires a signal having a predetermined length from the signal acquisition unit 2020 and extracts an inspection signal from the acquired signal with the length. The predetermined length is arbitrary. For example, the higher the frequency included in the partial inspection frequency band acquired from the partial determination unit 2080 is, the shorter the inspection signal extraction unit 2060 sets the predetermined length. In this case, for example, the predetermined length is a value calculated by the following equation 2. Parameter $t_{rec}$ is a value expressing length of an acquired signal by time.

Parameter $f_l$ denotes a lower-limit frequency of the acquired partial inspection frequency band. Parameter n denotes an arbitrary integer.

$$t_{rec} = \frac{1}{f_l} \times n \qquad \text{Equation 2}$$

Alternatively, for example, the inspection signal extraction unit 2060 may use a value manually input to the leak inspection device 2000 as the predetermined length. The predetermined length may be fixedly set in the inspection signal extraction unit 2060.

<Flow of Overall Determination Process>

Figure 2:
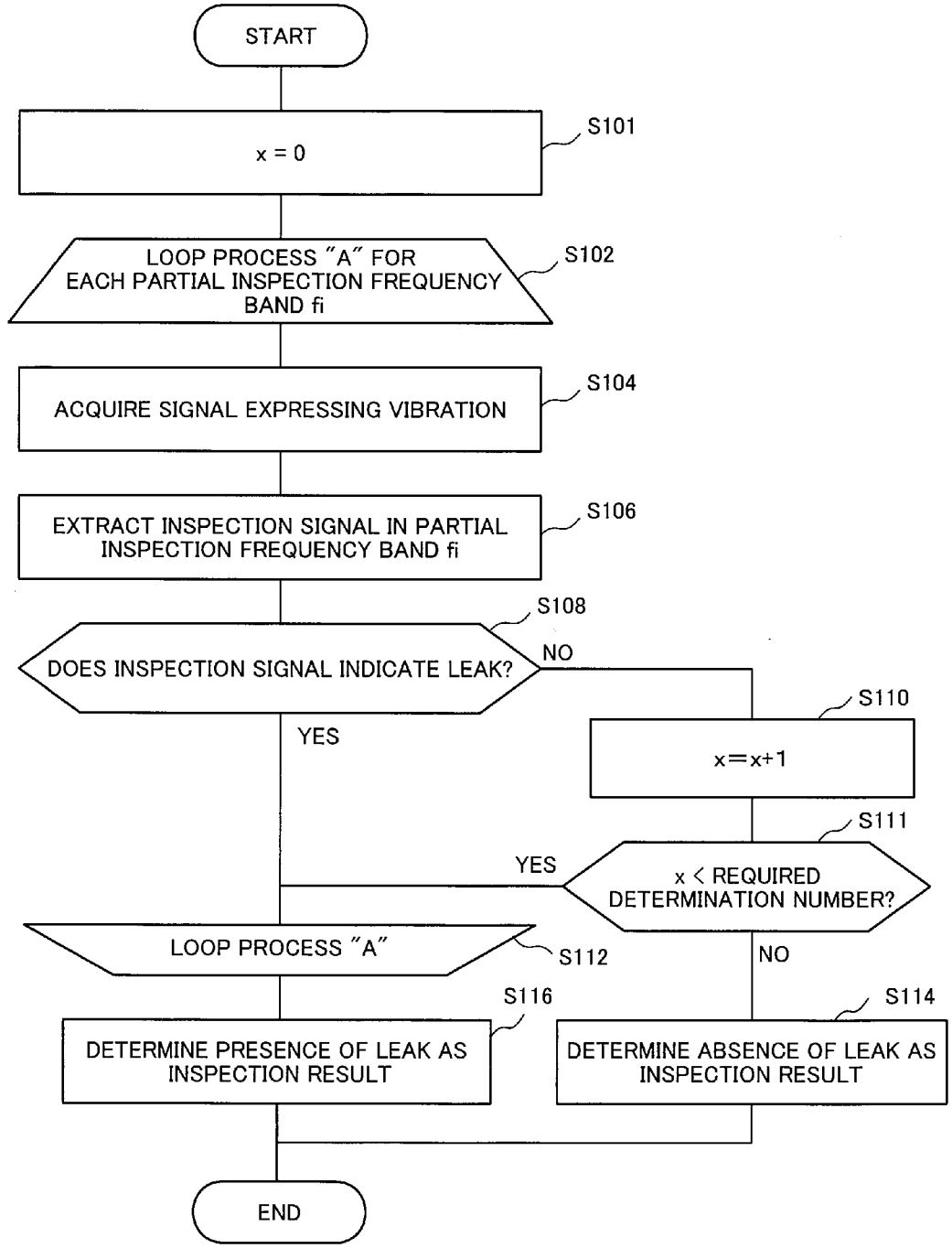
FIG. 2 is a flowchart illustrating an example of an overall determining process performed by the leak inspection device according to the first exemplary embodiment.

FIG. 2 is a flowchart illustrating an example of an overall determination process performed by the leak inspection device 2000 of the exemplary embodiment.

In step S101, the overall determination unit 2100 initializes a variable x to zero. The variable x expresses the number of the partial inspection frequency bands in which the result of determination made by the partial determination unit 2080 indicates a leak.

Steps S102 to S112 are a loop process performed on each of the plurality of partial inspection frequency bands by the leak inspection device 2000. In step S102, the overall determination unit 2100 determines whether a loop process A is finished on all of the partial inspection frequency bands or not. When the loop process A is finished on all of the partial inspection frequency bands, the overall determination process proceeds to step S116. When the loop process A is not performed on any of the partial inspection frequency bands, the overall determination unit 2100 selects one of the partial inspection frequency bands, which has not been subjected to the loop process A yet. The overall determination process proceeds to step S104. The selected partial inspection frequency band is described as a partial inspection frequency band fi. For example, the overall determination unit 2100 selects, as the partial inspection frequency band fi, in order from the partial inspection frequency band including the lowest frequency.

In step S104, the signal acquisition unit 2020 acquires a signal indicating a vibration.

In step S106, the overall determination unit 2100 acquires an inspection signal in the partial inspection frequency band fi. Concretely, the leak amount information acquisition unit 2100 uses the partial inspection frequency band fi as an input and operates the partial determination unit 2080. The partial determination unit 2080 which obtains the partial inspection frequency band fi uses the partial inspection frequency band fi as an input and operates the inspection signal extraction unit 2060. The inspection signal extraction unit 2060 which obtains the partial inspection frequency band fi acquires a signal from the signal acquisition unit 2020 and extracts an inspection signal in the partial inspection frequency band fi from the acquired signal.

In step S108, the overall determination unit 2100 determines whether the determination result by the partial determination unit 2080 indicates a leak or not. When the determination result by the partial determination unit 2080 indicates a leak, the overall determination process advances to step S112. When the determination result by the partial determination unit 2080 does not indicate a leak, the overall determination process proceeds to step S110.

In step S110, the overall determination unit 2100 increases x by one.

In step S111, the overall determination unit 2100 determines whether x is less than the required determination number or not. When x is less than the required determination number, the overall determination process proceeds to step S112. When x is equal to or larger than the required determination number, the overall determination process proceeds to step S114. In step S114, the overall determination unit 2100 determines no leak as an inspection result. Then, the overall determination unit 2100 finishes the overall determination process.

Since step S112 is the end of the loop process A, the process returns to step S106.

Step S116 is a process performed when the loop process A is finished on all of the partial inspection frequency bands. The overall determination unit 2100 determines presence of a leak as an inspection result. After that, the overall determination unit 2100 finishes the overall determination process.

<First Modification>

Figure 3:
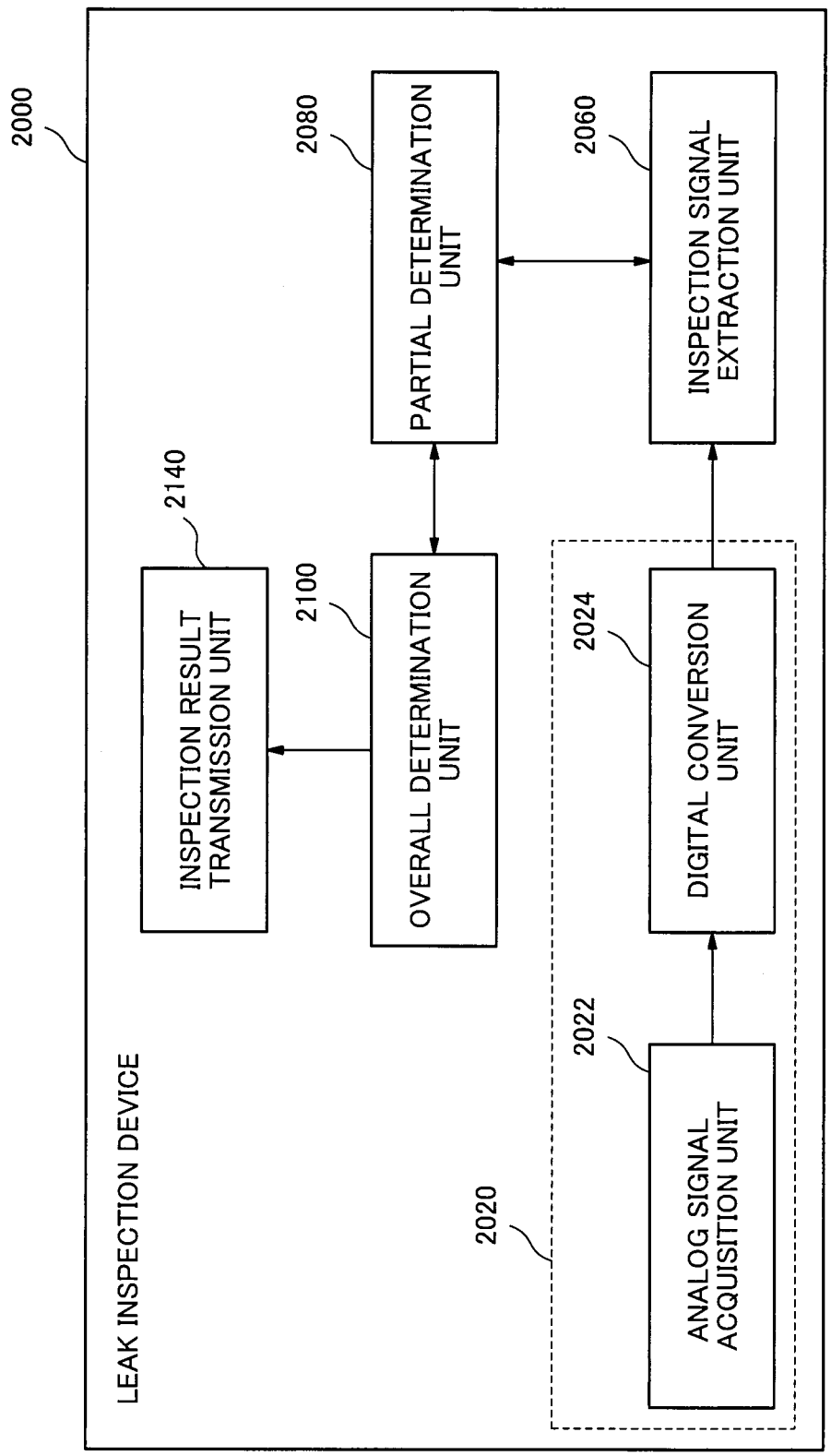
FIG. 3 is a block diagram illustrating a leak inspection device according to a first modification.

The leak inspection device 2000 notifies, for example, an external device communicably connected by a wireless circuit of the inspection result. In this case, the configuration of the leak inspection device 2000 is, for example, the configuration illustrated in FIG. 3. The leak inspection device 2000 illustrated in FIG. 3 is described as the leak inspection device 2000 of a first modification.

The leak inspection device 2000 of the first modification has an inspection result transmission unit 2140. The inspection result transmission unit 2140 is, for example, a network interface for transmitting information by radio.

The leak inspection device 2000 determines the presence/absence of a leak on the inside of the leak inspection device 2000. Consequently, the leak inspection device 200 transmits information indicating an inspection result on the presence/absence of a leak to an external device. In such a manner, as compared with the case of transmitting an analog signal or digital signal indicating a vibration to an external device, the amount of data transmitted at the time of the leak inspection can be made smaller. Therefore, when transmitting an inspection result by radio, the leak inspection device 2000 can transmit with smaller energy consumption.

<Operation and Effect>

With the above configuration, the leak inspection device 2000 of the exemplary embodiment sequentially determines whether inspection signals corresponding to a plurality of partial inspection frequency bands obtained by dividing a frequency band as an inspection target indicate a leak or not. When required determination number or more of inspection signals do not indicate a leak, the absence of a leak is determined as an inspection result. When it is determined that the required determination number or more of inspection signals corresponding to the partial inspection frequency bands do not indicate a leak, the leak inspection device 2000 does not have to perform a process on partial inspection frequency bands which are not yet subjected to the inspection at that time point. Consequently, since the amount of the process required for the leak inspection becomes smaller in the leak inspection device 2000 of the exemplary embodiment, energy consumption of the leak inspection device 2000 becomes smaller.

Second Exemplary Embodiment

<Outline>

The leak inspection device 2000 of a second exemplary embodiment is expressed by FIG. 1 like the leak inspection device 2000 of the first exemplary embodiment. Unless otherwise described, each functional component in the leak inspection device 2000 in the second exemplary embodiment has the same function as that of the functional components having the same reference numerals in the first exemplary embodiment.

The overall determination unit 2100 of the exemplary embodiment repeatedly performs the overall determination process described in the first exemplary embodiment by predetermined number of times. The process of repeating the overall determination process by predetermined number of times by the overall determination unit 2100 will be described as an iteration process. The predetermined number of times of repeating the overall determination process by the overall determination unit 2100 will be described as the number of iteration times.

The overall determination unit 2100 performs the overall determination process at predetermined time intervals in the iteration process. The predetermined time interval at which the overall determination unit 2100 performs the overall determination process will be described as an iteration cycle.

When the inspection result of the overall determination process is determined as no leak for the predetermined number of times or more in the iteration process, the overall determination unit 2100 determines no leak as a result of the iteration process and finishes the iteration process. The predetermined number of times used by the overall determination unit 2100 to determine whether the iteration process is finished or not will be referred to as allowable number. The overall determination unit 2100 of the exemplary embodiment uses the result of the iteration process as the inspection result of the leak inspection device 2000.

<Flow of Iteration Process>

Figure 4:
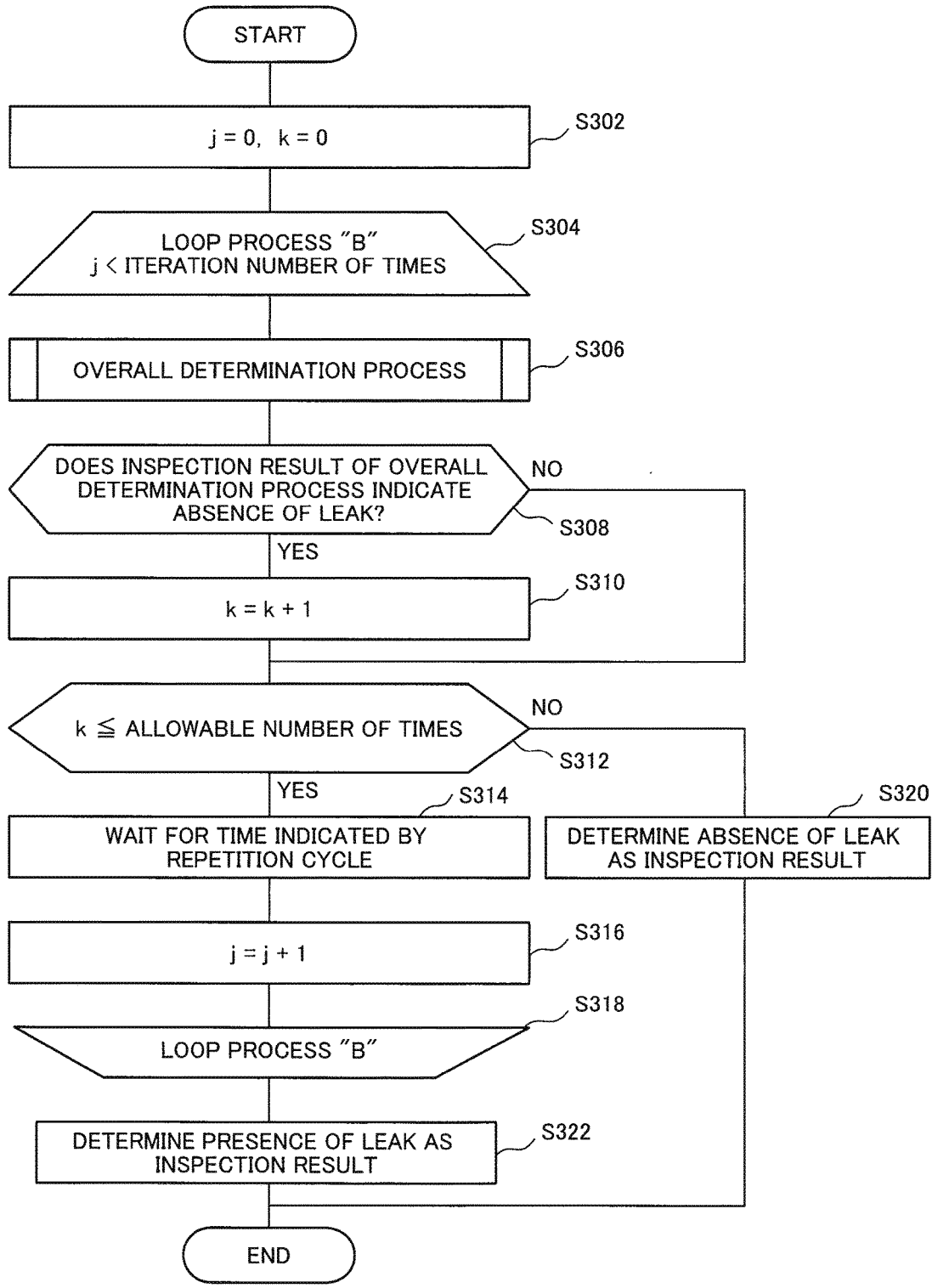
FIG. 4 is a flowchart illustrating an example of an iteration process performed by a leak inspection device according to a second exemplary embodiment.

FIG. 4 is a flowchart illustrating an example of the iteration process performed by the leak inspection device 2000 of the exemplary embodiment.

In step S302, variables j and k used as counters are initialized to zero. Parameter j denotes the number of times the overall determination process is performed. Parameter k denotes the number of times absence of a leak is determined in the overall determination process.

Steps S304 to S318 are a loop process B of iteratively performing the overall determination process. In step S304, the overall determination unit 2100 compares the number j of times the overall determination process is performed with the number of iteration times. When j is less than the number of iteration times, the process proceeds to step S306. When j is equal to or larger than the number of iteration times, the process proceeds to step S322.

In step S306, the overall determination unit 2100 performs the overall determination process. The overall determination process is described in, for example, the flowchart of FIG. 2 described in the first exemplary embodiment.

In step S308, the overall determination unit 2100 determines whether or not the result of the overall determination process performed in step S306 is absence of a leak. When the result of the overall determination process is absence of a leak, the process proceeds to step S310. When the result of the overall determination process is presence of a leak, the process proceeds to step S312.

In step S310, the overall determination unit 2100 increases k by one.

In step S312, the overall determination unit 2100 determines whether k is equal to or less than the allowable number. When k is equal to or less than the allowable number, the process proceeds to step S314. When k is larger than the allowable number, the process proceeds to step S320. In step S320, the overall determination unit 2100 determines absence of a leak as the inspection result by the leak inspection device 2000 and finishes the iteration process.

In step S314, the overall determination unit 2100 waits for the time indicated by the iteration cycle.

In step S316, the overall determination unit 2100 increases j by one.

Since step S318 is the end of the loop process B, the process returns to step S304.

In step S322, the overall determination unit 2100 determines the presence of a leak as an inspection result and finishes the iteration process.

<Second Modification>

Each time the overall determination process is performed, the overall determination unit 2100 of the exemplary embodiment may shorten the iteration cycle as the time interval of performing the overall determination process. The leak inspection device 2000 in which the overall determination unit 2100 shortens the iteration cycle each time the overall determination process is performed will be described as the leak inspection device 2000 of a second modification.

Figure 5:
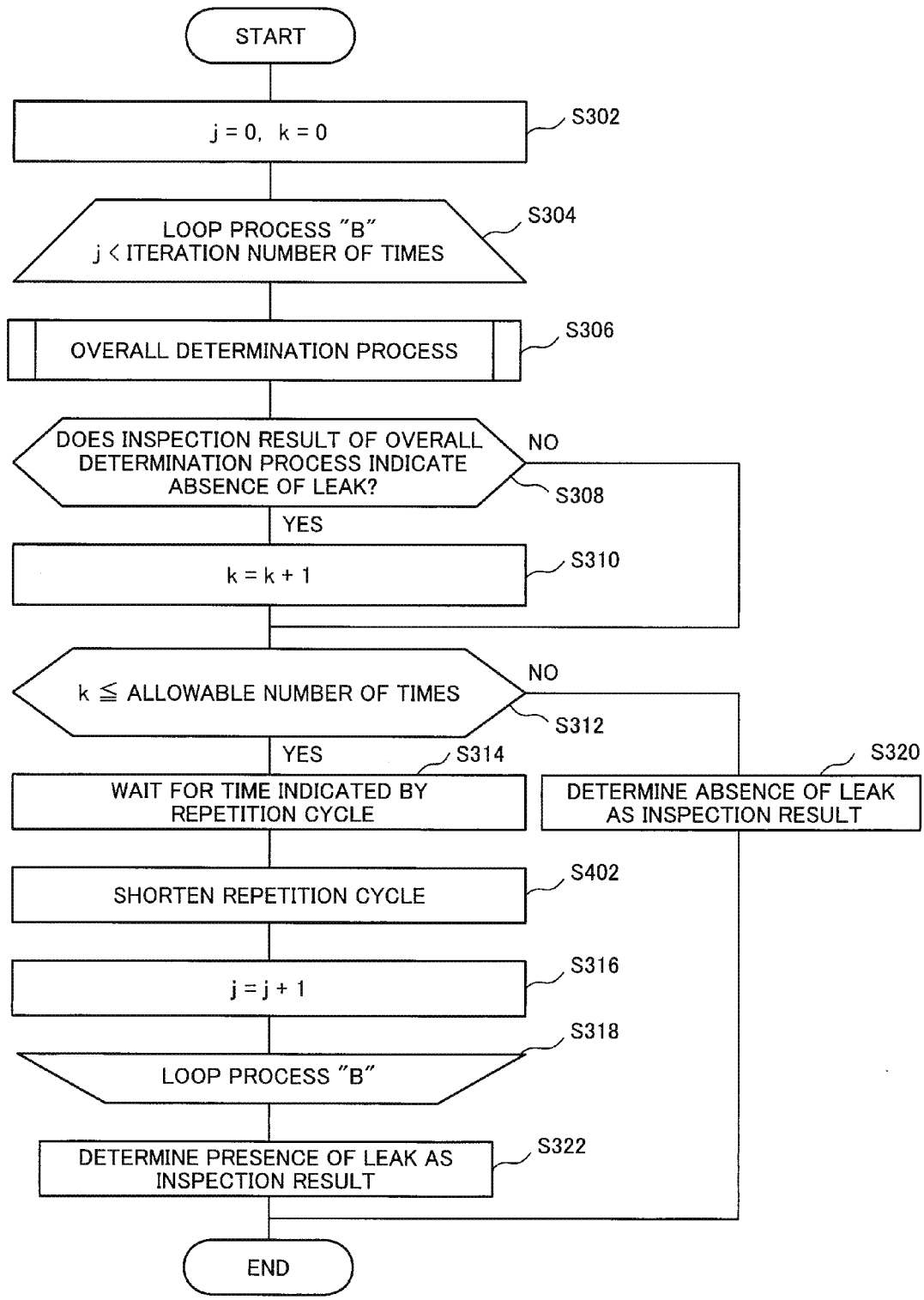
FIG. 5 is a flowchart illustrating an example of an iteration process performed by a leak inspection device according to a second modification.

FIG. 5 is the flow of the iteration process performed by the leak inspection device 2000 of the exemplary embodiment. The flowchart of FIG. 5 is the same as the flowchart of FIG. 4 except that there is step S402 after step S314. In step S402, the overall determination unit 2100 shortens the iteration cycle.

<Operation and Effect>

With the above configuration, in the leak inspection device 2000 of the exemplary embodiment, the overall determination unit 2100 performs an iteration process of repeating the overall determination process described in the first exemplary embodiment by predetermined number of times. When the inspection result of the overall determination process indicates absence of a leak by the allowable number of times or more in the iteration process, the overall determination unit 2100 determines absence of a leak as the result of the iteration process and finishes the iteration process. By repetitively determining the presence/absence of a leak every predetermined time, even when inspection signals in all of the partial inspection frequency bands indicate a leak in the overall determination process at a certain time due to disturbance, absence of a leak can be correctly detected by the overall determination process performed at different times. Therefore, in the exemplary embodiment, the probability that the presence of a leak is determined by mistake due to an influence such as disturbance can be reduced.

In the leak inspection device 2000 of the second modification, the overall determination unit 2100 shortens the iteration cycle each time the overall determination process is performed. For example, the leak inspection device 2000 of the second modification sets the initial value of the predetermined cycle to a value of a long cycle. When the overall determination process determines the presence of a leak, the interval of performing the overall determination process is shortened. In such a manner, the leak inspection device 2000 sets long time intervals of determining the presence/absence of a leak at normal times and, only when the possibility of a leak is detected, can determine the presence/absence of a leak at short time intervals. Thus, the leak inspection device 2000 can reduce the energy consumption by decreasing the process performed at normal times.

Third Exemplary Embodiment

Figure 6:
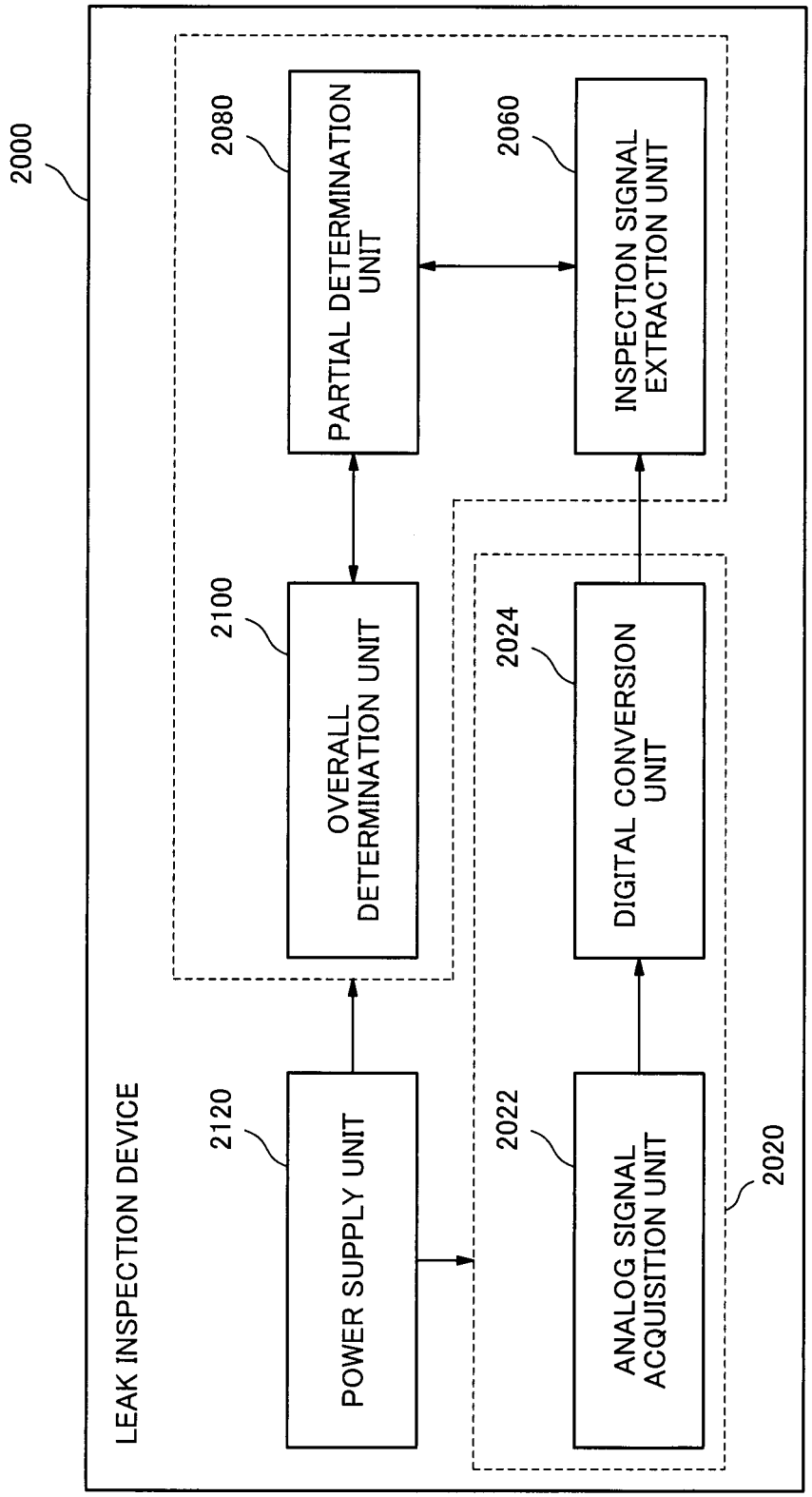
FIG. 6 is a block diagram illustrating a leak inspection device according to a third exemplary embodiment.

FIG. 6 is a block diagram illustrating the leak inspection device 2000 of the present exemplary embodiment. In FIG.

6, unless otherwise described, each of functional components having the same reference numeral as that of FIG. 1 has the same function as that of the functional components illustrated in FIG. 1. Therefore, the description of the functional components will be omitted.

The leak inspection device 2000 of the present exemplary embodiment has a power supply unit 2120. When the overall determination unit 2100 determines the presence/absence of a leak as an inspection result, the power supply unit 2120 stops power supply to hardware realizing the leak inspection device 2000. The timing at which the power supply unit 2120 stops power supply to hardware realizing the leak inspection device 2000 is, for example, the same timing when the overall determination unit 2100 determines an inspection result, immediately after the overall determination unit 2100 determines an inspection result, after a lapse of a certain time since the overall determination unit 2100 determines an inspection result, or the like. In such a manner, energy consumed by hardware realizing each of functional components of the leak inspection device 2000 can be reduced.

Hardware to which power supply is stopped by the power supply unit 2120 includes, for example, a vibration measuring device realizing the signal acquisition unit 2020, the inspection signal extraction unit 2060, the partial determination unit 2080, and a device such as an MCU or CPU realizing the overall determination unit 2100. The power supply unit 2120 selects at least one of the hardware and stops power supply to the selected hardware.

Figure 7:
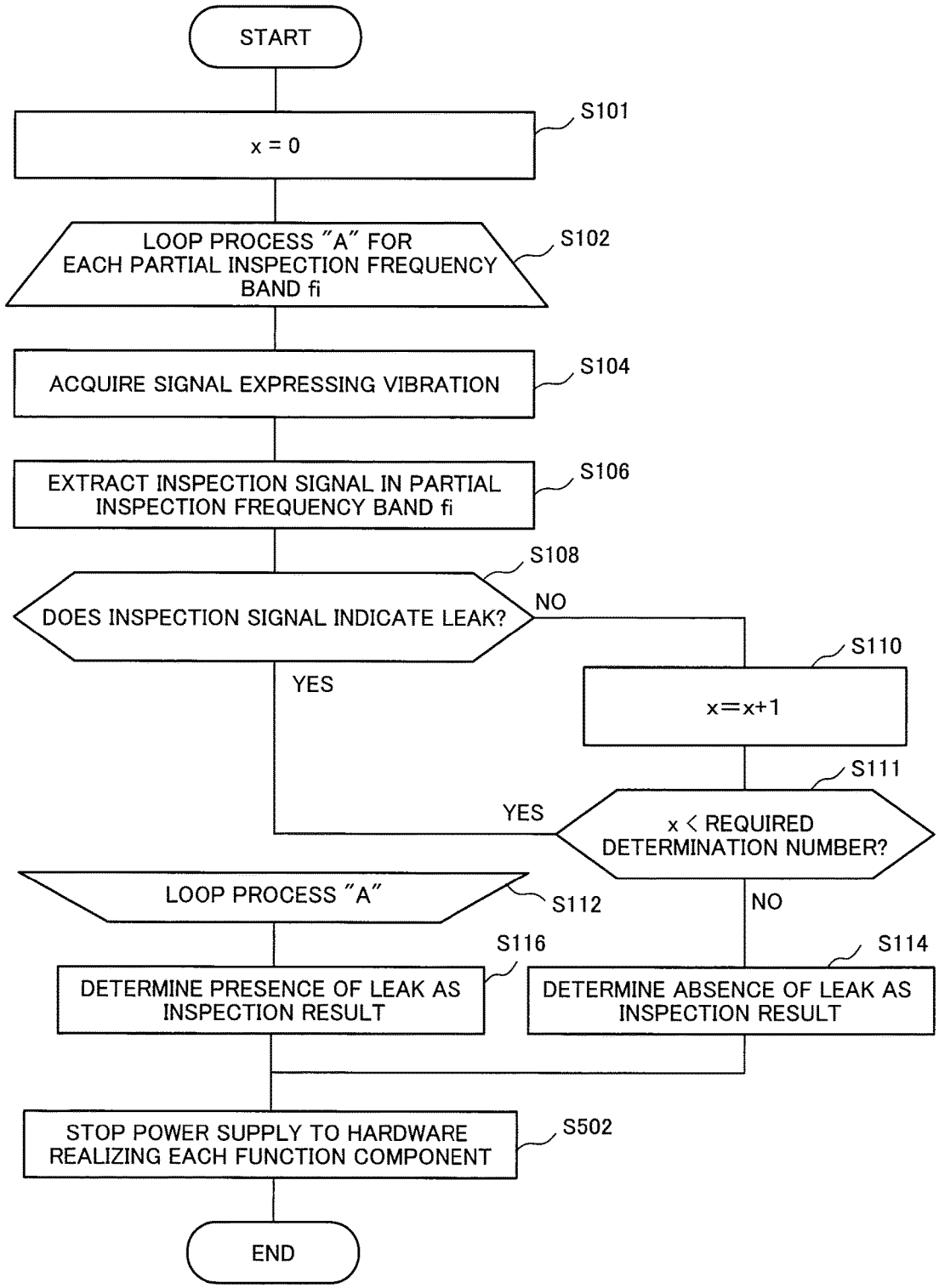
FIG. 7 is a flowchart illustrating an example of an overall determining process performed by the leak inspection device according to the third exemplary embodiment.

FIG. 7 illustrates an example of the overall determination process performed by the leak inspection device 2000 of the present exemplary embodiment. The flowchart of FIG. 7 is the same as the flowchart of FIG. 2 described in the first exemplary embodiment except for the point that it has step S502. Therefore, the description of the steps other than step S502 will be omitted.

In step S502, the power supply unit 2120 stops power supply to the hardware realizing the functional components.

The leak inspection device 2000 of the present exemplary embodiment may perform the iteration process like the leak inspection devices 2000 of the second exemplary embodiment and the second modification. In this case, the power supply unit 2120 performs the process of step S502 at the timing when the overall determination unit 2100 finishes the iteration process.

<Third Modification>

When the signal acquisition unit 2020 finishes the process, the power supply unit 2120 may stop power supply to the hardware (such as a vibration sensor) realizing the signal acquisition unit 2020. The leak inspection device 2000 of the present exemplary embodiment in this case will be described as the leak inspection device 2000 of a third modification. The timing at which the power supply unit 2120 stops power supply to hardware realizing the signal acquisition device 2020 is, for example, the same timing when the power supply unit 2120 finishes the process, immediately after the signal acquisition unit 2020 finishes the process, after a lapse of a certain time since the power supply unit 2120 finishes the process, or the like. In such a manner, the leak inspection device 2000 of the third modification can reduce energy consumption of hardware realizing the signal acquisition unit 2020. As a result, the energy consumption of the leak inspection device 2000 can be further decreased.

Figure 8:
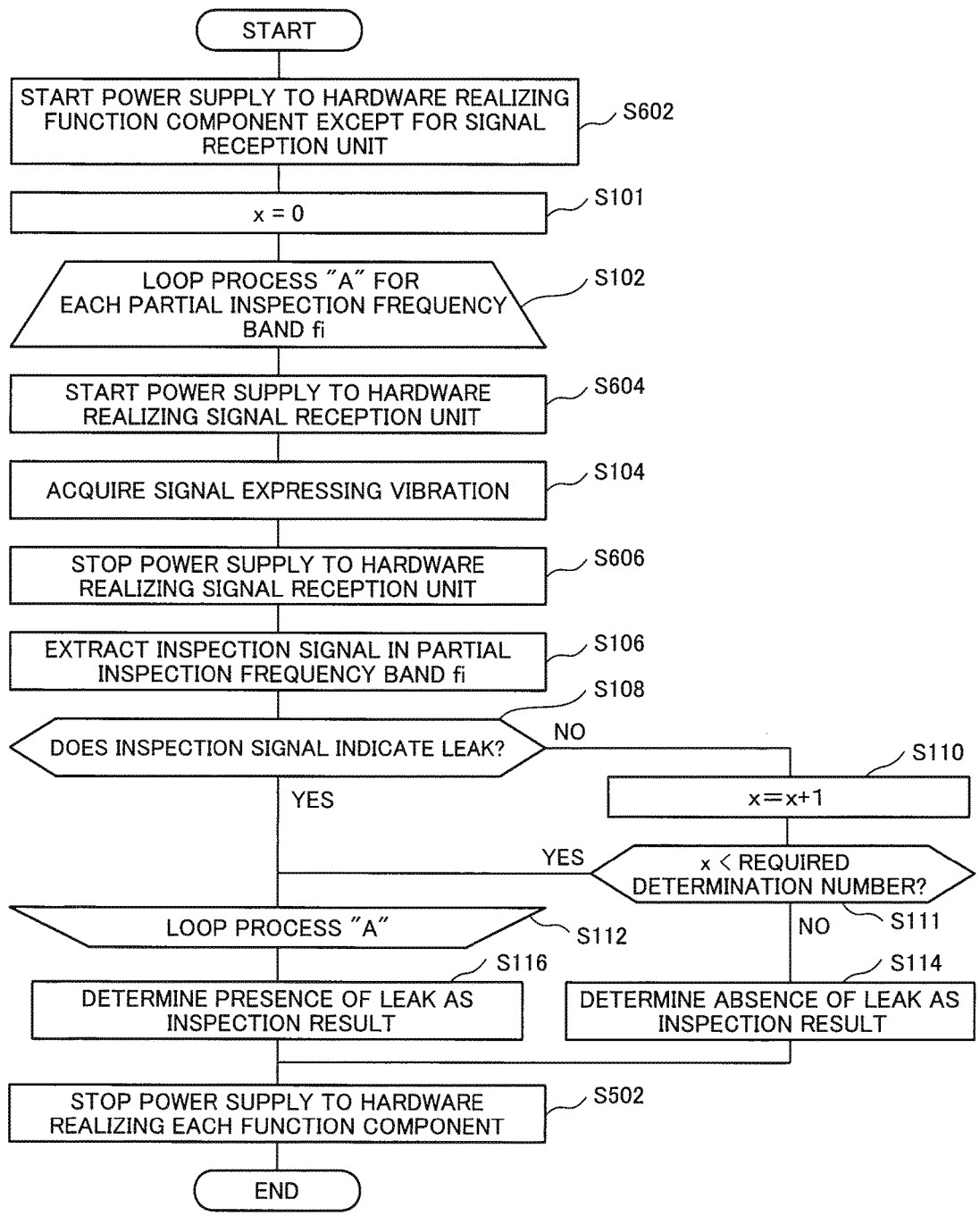
FIG. 8 is a flowchart illustrating an example of an overall determining process performed by a leak inspection device according to a third modification.

FIG. 8 illustrates an example of the overall determination process by the leak inspection device 2000 of the third modification. In FIG. 8, in steps having the same numerals as those in the flowchart of FIG. 7 described in the first exemplary embodiment, processes similar to those in the steps having the same numerals in FIG. 7 are performed. Therefore, the description of the steps will be omitted.

Before the overall determination unit 2100 starts the process of step S102, in step S602, the power supply unit 2120 starts power supply to the hardware realizing the functional component other than the signal acquisition unit 2020.

Before the signal acquisition unit 2020 starts the process of step S104, in step S604, the power supply unit 2120 starts power supply to the hardware realizing the signal acquisition unit 2020.

After the signal acquisition unit 2020 finishes the process in step S104, in step S606, the power supply unit 2120 stops power supply to the hardware realizing the signal acquisition unit 2020.

Similar to the leak inspection devices 2000 of the second exemplary embodiment and the second modification, the leak inspection device 2000 of the modification may perform the iteration process. In this case, the power supply unit 2120 performs the process of step S502 at the timing when the overall determination unit 2100 finishes the iteration process.

<Fourth Modification>

Figure 9:
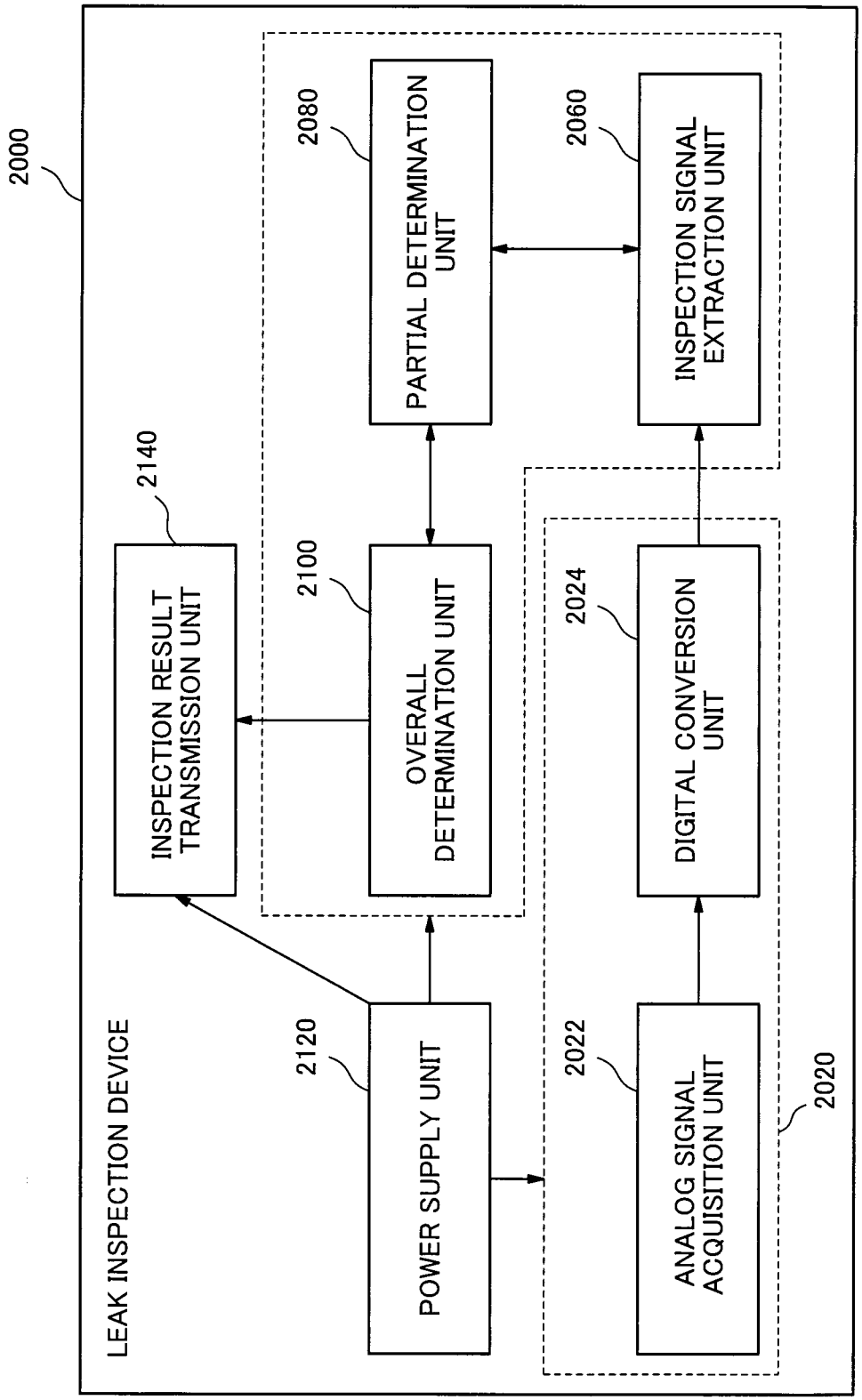
FIG. 9 is a block diagram illustrating a leak inspection device according to a fourth modification.

The leak inspection device 2000 of a fourth exemplary embodiment may further include the inspection result transmission unit 2140 which is included in the leak inspection device 2000 of the first modification. The leak inspection device 2000 of the fourth exemplary embodiment further including the inspection result transmission unit 2140 will be described as the leak inspection device 2000 of the fourth modification. The configuration of the leak inspection device 2000 of the fourth modification is expressed by, for example, the block diagram of FIG. 9.

When the inspection result transmission unit 2140 finishes transmission of an inspection result, the power supply unit 2120 of the fourth modification stops power supply to hardware realizing the inspection result transmission unit 2140. The timing at which the power supply unit 2120 stops power supply to hardware realizing the inspection result transmission unit 2140 is, for example, the same timing when the inspection result transmission unit 2140 finishes transmission of an inspection result, immediately after the inspection result transmission unit 2140 finishes transmission of an inspection result, after a lapse of a certain time since the inspection result transmission unit 2140 finishes transmission of an inspection result, or the like. In such a manner, the energy consumed by hardware realizing the inspection result transmission unit 2140 is reduced. As a result, the energy consumption of the leak inspection device 2000 can be further decreased. As described above, the hardware realizing the inspection result transmission unit 2140 is, for example, a network interface transmitting information by radio.

Figure 10:
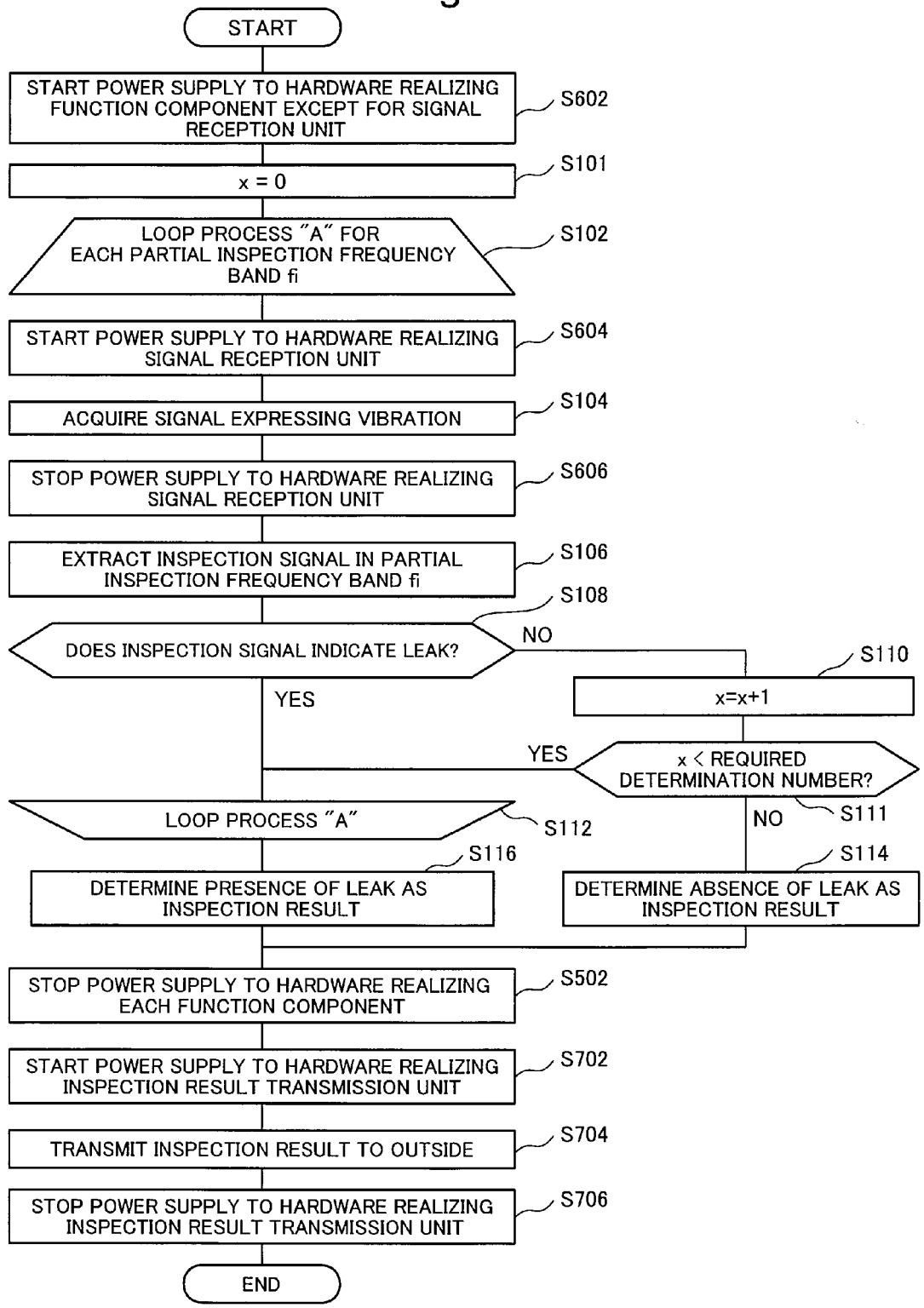
FIG. 10 is a flowchart illustrating an example of an overall determining process performed by the leak inspection device according to the fourth modification.

FIG. 10 illustrates an example of a leak inspection by the leak inspection device 2000 of the fourth modification. In FIG. 10, in steps having the same numerals as those in the flowchart of FIG. 8 described in the third modification, processes similar to those in the steps having the same numerals in FIG. 8 are performed. Therefore, the description of the steps will be properly omitted.

In step S702, the power supply unit 2120 starts power supply to hardware realizing the inspection result transmission unit 2140.

In step S704, the inspection result transmission unit 2140 transmits an inspection result by the leak inspection device 2000 to the outside.

In step S706, the power supply unit 2120 finishes power supply to hardware realizing the inspection result transmission unit 2140.

The leak inspection device 2000 of the modification may perform the iteration process like the leak inspection devices 2000 of the second exemplary embodiment and the second modification. In this case, the power supply unit 2120 performs the process of step S502 at the timing when the overall determination unit 2100 finishes the iteration process.

<Operation and Effect>

With the above configuration, when the overall determination unit 2100 determines the presence/absence of a leak as an inspection result, the leak inspection device 2000 of the third exemplary embodiment stops power supply to hardware realizing each of the functional components of the leak inspection device 2000. In such a manner, the energy consumed by hardware realizing each of the functional components of the leak inspection device 2000 can be reduced.

When the signal acquisition unit 2020 finishes the process, the leak inspection device 2000 of the third modification stops power supply to hardware realizing the signal acquisition unit 2020. In such a manner, the energy consumed by hardware realizing the signal acquisition unit 2020 can be reduced. As a result, the energy consumed by the leak inspection device 2000 is further decreased.

The leak inspection device 2000 of the fourth modification further includes the inspection result transmission unit 2140. When the inspection result transmission unit 2140 finishes transmission of an inspection result, the power supply unit 2120 stops power supply to hardware realizing the inspection result transmission unit 2140. In such a manner, the energy consumed by hardware realizing the inspection result transmission unit 2140 can be reduced. As a result, the energy consumed by the leak inspection device 2000 further decreases.

Although the exemplary embodiments and modifications of the present invention have been described above with respect to the drawings, those are examples of the present invention, and combinations of the exemplary embodiments and modifications and various configurations other than the exemplary embodiments and modifications can be also employed.

Hereinbelow, examples of reference modes will be supplementarily described.

1. A leak inspection device comprising:
   signal acquisition means for acquiring a signal;
   inspection signal extraction means for extracting, as an inspection signal, a signal in any of a plurality of partial inspection frequency bands obtained by dividing a frequency band as an inspection target, from the signal acquired by the signal acquisition means; and
   determination means for sequentially determining whether the inspection signals corresponding to the partial inspection frequency bands which are different from one another indicate a leak or not and, when predetermined number or more of the inspection signals do not indicate a leak, determining that there is no leak.

2. The leak inspection device described in 1, wherein the determination means includes:
   partial determination means for determining whether the inspection signal corresponding to one partial inspection frequency band indicates a leak or not; and
   overall determination means for performing an overall determination process of sequentially selecting one of the plurality of partial inspection frequency bands and sequentially making the partial determination means operate in correspondence with the selected partial inspection frequency band until the partial determination means determines that the predetermined number or more of the inspection signals do not indicate a leak.

3. The leak inspection device described in 2, wherein the overall determination means supplies the partial inspection frequency bands to the partial determination means in ascending order of frequencies included in the partial inspection frequency bands.

4. The leak inspection device described in 2 or 3, wherein the overall determination means repetitively performs the overall determination process predetermined number of times at predetermined cycles and, when all of inspection results of the overall determination process indicate presence of a leak, determines presence of a leak as an inspection result of the overall determination means.

5. The leak inspection device described in 4, wherein the overall determination means repeats the overall determination process while shortening the predetermined cycle.

6. The leak inspection device described in any one of 1 to 5, wherein the inspection signal extraction means acquires, from the signal acquisition means, a signal of time which is shorter as a frequency included in the partial inspection frequency band as an extraction target becomes higher.

7. The leak inspection device described in any one of 1 to 6, wherein the signal acquisition means includes analog signal acquisition means for acquiring an analog signal and digital conversion means for converting the analog signal acquired from the analog signal acquisition means to a digital signal, and
   the digital conversion means acquires the partial inspection frequency band from the inspection signal extraction means and converts the analog signal to the digital signal at a sampling frequency which is higher as a frequency included in the partial inspection frequency band acquired becomes higher.

8. The leak inspection device described in any one of 1 to 7, further comprising inspection result transmission means for transmitting an inspection result of the determination means by radio.

9. The leak inspection device described in any one of 1 to 8, further comprising power supply means for stopping power supply to one or more of the means, when the determination means determines the presence/absence of a leak as an inspection result.

10. The leak inspection device described in 9, wherein when the signal acquisition means finishes a process, the power supply means stops power supply to the signal acquisition means.

11. The leak inspection device described in 9 or 10, further comprising inspection result transmission means for transmitting the inspection result determined by the determination means by radio, wherein
   when the inspection result transmission means finishes transmission of an inspection result, the power supply means stops power supply to the inspection result transmission means.

12. A program causing a computer to have a function of operating as a leak inspection device, and causing the computer to have:
   a signal acquisition function of acquiring a signal;
   an inspection signal extraction function of extracting, as an inspection signal, a signal in any of a plurality of partial inspection frequency bands obtained by dividing a frequency band as an inspection target, from the signal acquired by the signal acquisition function; and a determination function of sequentially determining whether the inspection signals corresponding to the partial inspection frequency bands which are different from one another indicate a leak or not and, when predetermined number or more of the inspection signals do not indicate a leak, determining that there is no leak.

13. The program described in 12, wherein the determination function includes:
a partial determination function of determining whether the inspection signal corresponding to one partial inspection frequency band indicates a leak or not; and
an overall determination function of performing an overall determination process of sequentially selecting one of the plurality of partial inspection frequency bands and sequentially making the partial determination function operate in correspondence with the selected partial inspection frequency band until the partial determination function determines that the predetermined number or more of the inspection signals do not indicate a leak.

14. The program described in 13, wherein the overall determination function supplies the partial inspection frequency bands to the partial determination function in ascending order of frequencies included in the partial inspection frequency bands.

15. The program described in 13 or 14, wherein the overall determination function repetitively performs the overall determination process predetermined number of times at predetermined cycles and, when all of inspection results of the overall determination process indicate presence of a leak, determines presence of a leak as an inspection result of the overall determination function.

16. The program described in 15, wherein the overall determination function repeats the overall determination process while shortening the predetermined cycle.

17. The program described in any one of 12 to 16, wherein the inspection signal extraction function acquires from the signal acquisition function a signal of time which is shorter as a frequency included in the partial inspection frequency band as an extraction target becomes higher.

18. The program described in any one of 12 to 17, wherein the signal acquisition function includes an analog signal acquisition function of acquiring an analog signal and a digital conversion function of converting the analog signal acquired from the analog signal acquisition function to the digital signal, and
the digital conversion function acquires the partial inspection frequency band from the inspection signal extraction function and converts the analog signal to a digital signal at a sampling frequency which is higher as a frequency included in the partial inspection frequency band acquired becomes higher.

19. The program described in any one of 12 to 18, making the computer further have an inspection result transmission function of transmitting an inspection result of the determination function by radio.

20. The program described in any one of 12 to 19, making the computer further have a power supply function for stopping power supply to one or more of the functions, when the determination function determines the presence/absence of a leak as an inspection result.

21. The program described in 20, wherein when the signal acquisition function finishes a process, the power supply function stops power supply to the signal acquisition function.

22. The program described in 20 or 21, making the computer further have an inspection result transmission function of transmitting the inspection result determined by the determination function by radio, wherein
when the inspection result transmission function finishes transmission of an inspection result, the power supply function stops power supply to the inspection result transmission function.

23. A control method executed by a computer operating as a leak inspection device, comprising:
a signal acquisition step of acquiring a signal;
an inspection signal extraction step of extracting, as an inspection signal, a signal in any of a plurality of partial inspection frequency bands obtained by dividing a frequency band as an inspection target, from the signal acquired in the signal acquisition step; and
a determination step of sequentially determining whether the inspection signals corresponding to the partial inspection frequency bands which are different from one another indicate a leak or not and, when predetermined number or more of the inspection signals do not indicate a leak, determining that there is no leak.

24. The control method described in 23, wherein the determination step includes:
a partial determination step of determining whether the inspection signal corresponding to one partial inspection frequency band indicates a leak or not; and
an overall determination step of performing an overall determination process of sequentially selecting one of the plurality of partial inspection frequency bands and sequentially making the partial determination step operate in correspondence with the selected partial inspection frequency band until the partial determination step determines that the predetermined number or more of the inspection signals do not indicate a leak.

25. The control method described in 24, wherein the overall determination step supplies the partial inspection frequency bands to the partial determination step in ascending order of frequencies included in the partial inspection frequency bands.

26. The control method described in 24 or 25, wherein the overall determination step repetitively performs the overall determination process predetermined number of times at predetermined cycles and, when all of inspection results of the overall determination process indicate presence of a leak, determines presence of a leak as an inspection result of the overall determination step.

27. The control method described in 26, wherein the overall determination step repeats the overall determination process while shortening the predetermined cycle.

28. The control method described in any one of 23 to 27, wherein the inspection signal extraction step acquires from the signal acquisition step a signal of time which is shorter the higher a frequency included in the partial inspection frequency band as an extraction target is.

29. The control method described in any one of 23 to 28, wherein the signal acquisition step includes an analog signal acquisition step of acquiring an analog signal and a digital conversion step of converting the analog signal acquired from the analog signal acquisition step to the digital signal, and
the digital conversion step acquires the partial inspection frequency band from the inspection signal extraction step and converts the analog signal to a digital signal at a sampling frequency which is higher the higher a frequency included in the partial inspection frequency band acquired is.

30. The control method described in any one of 23 to 29, further comprising an inspection result transmission step of transmitting an inspection result of the determination step by radio.

31. The control method described in any one of 23 to 30, further comprising a power supply step, when the determination step determines the presence/absence of a leak as an inspection result, of stopping power supply to one or more of the steps.

32. The control method described in 31, wherein when the signal acquisition step finishes a process, the power supply step stops power supply to the signal acquisition step.

33. The control method described in 31 or 32, further comprising an inspection result transmission step of transmitting the inspection result determined in the determination step by radio, wherein
when the inspection result transmission step finishes transmission of an inspection result, the power supply step stops power supply to the inspection result transmission step.

The present application claims priority based on Japanese Patent Application No. 2012-215672 filed on Sep. 28, 2012, the entire disclosure of which is incorporated herein.

What is claimed is:

1. A leak inspection device comprising:
a processor;
a memory storing code that the processor executes to:
causes an acquisition hardware device to acquire a signal;
extract, as an inspection signal, a signal in any of a plurality of partial inspection frequency bands obtained by dividing a frequency band as an inspection target, from the signal acquired; and
sequentially determine whether the inspection signals corresponding to the partial inspection frequency bands which are different from one another indicate a leak or not and, when predetermined number or more of the inspection signals do not indicate a leak, determining that there is no leak, by:
determining, via a partial determination process, whether the inspection signal corresponding to one partial inspection frequency band indicates a leak or not; and
performing an overall determination process of sequentially selecting one of the plurality of partial inspection frequency bands and sequentially making the partial determination process operate in correspondence with the selected partial inspection frequency band until the partial determination process determines that the predetermined number or more of the inspection signals do not indicate a leak.

2. The leak inspection device according to claim 1, wherein the partial inspection frequency bands are supplied to the partial determination process in ascending order of frequencies included in the partial inspection frequency bands.

3. The leak inspection device according to claim 2, wherein the overall determination process is repetitively performed a predetermined number of times at predetermined cycles and, when all of inspection results of the overall determination process indicate presence of a leak, determines presence of a leak as an inspection result of the overall determination process.

4. The leak inspection device according to claim 3, wherein the overall determination process is repeated while shortening the predetermined cycle.

5. The leak inspection device according to claim 1, wherein a signal of time is acquired which is shorter the higher a frequency included in the partial inspection frequency band as an extraction target is.

6. The leak inspection device according to claim 1, wherein an analog signal is acquired and converted to a digital signal via a digital conversion process, and
the digital conversion process converts the analog signal to the digital signal at a sampling frequency which is higher the higher a frequency included in the partial inspection frequency band acquired is.

7. The leak inspection device according to claim 1, wherein the processor further executes the code to transmit an inspection result by a radio.

8. The leak inspection device according to claim 1, wherein the processor further stops power when the presence/absence of a leak is determined as an inspection result.

9. The leak inspection device according to claim 8, wherein power is stopped to the acquisition hardware device after acquiring the signal.

10. The leak inspection device according to claim 8, wherein the processor further executes the code to transmit the inspection result by a radio, wherein
the power is stopped to the radio after transmission of an inspection result.

11. A non-transitory computer-readable storage medium storing a program causing a computer to have a function of operating as a leak inspection device, and causing the computer to have:
a signal acquisition function of acquiring a signal;
an inspection signal extraction function of extracting, as an inspection signal, a signal in any of a plurality of partial inspection frequency bands obtained by dividing a frequency band as an inspection target from the signal acquired by the signal acquisition function; and
a determination function of sequentially determining whether the inspection signals corresponding to the partial inspection frequency bands which are different from one another indicate a leak or not and, when predetermined number or more of the inspection signals do not indicate a leak, determining that there is no leak,
wherein the determination function includes:
a partial determination function determining whether the inspection signal corresponding to one partial inspection frequency band indicates a leak or not; and
an overall determination function performing an overall determination process of sequentially selecting one of the plurality of partial inspection frequency bands and sequentially making the partial determination function operate in correspondence with the selected partial inspection frequency band until the partial determination function determines that the predetermined number or more of the inspection signals do not indicate a leak.

12. A control method executed by a computer operating as a leak inspection device, comprising:
acquiring a signal;
extracting, as an inspection signal, a signal in any of a plurality of partial inspection frequency bands obtained by dividing a frequency band as an inspection target, from the signal acquired in the signal acquisition; and
determining sequentially whether the inspection signals corresponding to the partial inspection frequency bands which are different from one another indicate a leak or not and, when predetermined number or more of the inspection signals do not indicate a leak, determining that there is no leak,
wherein the determining includes:

determining, via a partial determination process, whether the inspection signal corresponding to one partial inspection frequency band indicates a leak or not; and performing an overall determination process of sequentially selecting one of the plurality of partial inspection frequency bands and sequentially making the partial determination process operate in correspondence with the selected partial inspection frequency band until the partial determination process determines that the predetermined number or more of the inspection signals do not indicate a leak.

\* \* \* \* \*